United States Patent [19]

Barany

[11] Patent Number: 4,937,865
[45] Date of Patent: Jun. 26, 1990

[54] CABLE TV CHANNEL SECURITY SYSTEM HAVING REMOTELY ADDRESSABLE TRAPS

[75] Inventor: David A. Barany, Manlius, N.Y.

[73] Assignee: Syrcuits International Inc., Liverpool, N.Y.

[21] Appl. No.: 271,622

[22] Filed: Nov. 15, 1988

[51] Int. Cl.⁵ .............................................. H04K 1/00
[52] U.S. Cl. ........................................................ 380/7
[58] Field of Search ....................................... 380/7, 20

[56] References Cited

U.S. PATENT DOCUMENTS

| | | |
|---|---|---|
| 4,085,422 | 4/1978 | Niwata et al. ............................ 380/7 |
| 4,354,201 | 10/1982 | Sechet et al. ............................ 380/7 |
| 4,367,557 | 1/1983 | Stern et al. .............................. 380/7 |
| 4,450,481 | 5/1984 | Dickinson ................................ 380/7 |
| 4,769,838 | 9/1988 | Hasegawa ................................ 380/7 |
| 4,792,971 | 12/1988 | Uemura .................................... 380/7 |

Primary Examiner—Thomas H. Tarcza
Assistant Examiner—David Cain
Attorney, Agent, or Firm—Charles S. McGuire

[57] ABSTRACT

A cable television channel security system for installation at a subscriber location to control access to one of more channels of RF signals transmitted from a headend location via conventional cable means. The system is divided into two major subassemblies, a so-called address module and a switch module, the latter including one or more conventional traps. The address module receives a sequence of coded signals selectively inserted through a personal computer at the cable system business office and carried on portions of the RF signals transmitted at the headend. The coded signals include a first portion unique to each subscriber location and a second portion indicating which of the premium channels are to be directed to traps, and which are to bypass the traps of the switch module. As signals are transmitted and received in the clear, i.e., without descrambling, with reception of premium channels controlled entirely from the business office by addressing the desired subscriber location, and the individual traps positioned thereat within a securely closed housing.

22 Claims, 6 Drawing Sheets

CABLE TV CHANNEL SECURITY SYSTEM HAVING REMOTELY ADDRESSABLE TRAPS

BACKGROUND OF THE INVENTION

The present invention relates to controlling reception of RF signals transmitted over a cable TV system and, more particularly, is directed to a remotely controlable system for mounting on the exterior of a subscriber dwelling or other structure to selectively permit or prevent reception of premium channels.

The cable television industry derives its income from the sale of subscription television programming transmitted via cable means from a location commonly termed a "headend." RF signals, normally received through a suitable antenna and down converter from one or more satellites in stationary orbit, are transmitted from the headend on a plurality of channels, some of which are designated as "basic" and others as "premium" channels. The cable means carrying the signals extends from the headend to the various subscriber locations for connection to television receivers adapted either by internal circuitry or by external converters to receive the channels carried on the cable. For an estblished, periodically payable fee, RF signals corresponding to the "basic" channels are received for broadcast on the subscriber's television set(s). Premium channels may also be received for viewing by the subscriber only if additional fees are paid to the cable transmitting service.

Since both basic and premium channels are carried by the same cable, means must be provided to permit reception and viewing of only those channels for which the required fee is paid. One such means for performing this function is through the use of devices known as traps. Conventional traps in current use fall generally into two categories, namely, negative traps which remove (or negate) a particular channel frequency which is not to be received, and positive traps which remove an interfering carrier which has been inserted at the headend from the spectrum of a particular channel. Thus, negative traps are included in the cable line between the headend and the subscriber's television set to prevent reception of one or more channels, while positive traps are connected in the line to permit reception of a particular channel without interference.

In any case, the control of reception of premium cable TV channels has required the physical installation and removal of traps at each subscriber location whenever reception of premium channels was initiated or terminated. Obviously, a considerable amount of inconvenience and cost is associated with sending a technician to a subscriber location to install or remove traps, which are often positioned at the top of a utility pole, each time premium channel service is changed. Therefore, although traps provide a very effective means of controlling channel access, and are relatively inexpensive and dependable devices, other means have been proposed in order to avoid the inconvenience and costs associated with their frequent installation and removal.

The most commonly used alternative to traps for providing channel security is electronic equipment which scrambles the RF signals carried by premium channels at the headend and descrambles at the subscriber location the signals on those channels for which the required fee has been paid. Descramblers are also generally divided into two general categories, i.e., programmable and addressable descramblers. Each scrambled channel has impressed upon it a unique electrical identification code, or program level. The programmable descrambler receives the scrambled signals and the accompanying identification code and, if it has been pre-set (programmed) to descramble signals at that program level, engages the restoration circuitry.

The addressable descrambler has a unique, coded address, usually built-in at the time of manufacture. A data stream including address and command codes is generated at the cable system headend and is received by the addressable descramblers at the subscriber locations. If the address code in the data stream matches the pre-set address of a particular descrambler, the premium channels indicated by the command code are descrambled. The appropriate codes are entered, in response to subscriber requests, into a computer terminal for transmission through appropriate interface devices to the addressable descramblers. Although the use of scramblers and descramblers has provided a convenient and cost-effective means of controlling access to premium channels, the advent of video recording systems (VCRs) has introduced a further difficulty. Since the descrambler is capable of processing only the particular channel to which the associated television receiver is tuned at a given time, if a scrambled channel is to be recorded, the descrambler must be in the circuit ahead of the VCR. If the subscriber wishes to view another, non-scrambled channel while the scrambled channel is being recorded, a device called a signal splitter must be installed in the line ahead of the descrambler to permit transmission of the non-scrambled channel directly to the receiver. The elements must be rewired to permit viewing a scrambled channel while recording a non-scrambled channel. In order to view and record two scrambled channel simultaneously, two descramblers are required with a signal splitter having outputs connected to each.

Rather than making the necessary wiring changes, most subscribers connect their descramblers and signal splitter in one of the aforementioned configurations and simply do not simultaneously view and record channels which that configuration is not equipped to handle. Instead, many subscribers terminate service on some or all of the premium channels and obtain the desired video recordings from tape rental outlets. This, of course, deprives the cable TV operators of a significant amount of revenue. Furthermore, the use of descramblers and converters may render many of the features of remotely-controlled, cable-ready television sets largely useless.

Thus, it is apparent that a need exists for a means to control access to premium channels which is not only cost-effective and dependable, but also does not deprive the subscriber of the benefits of conveniently viewing an recording all desired channels. The provision of such means is the principal object of the present invention.

A further object is to provide a cable TV channel security system using industry standard traps which do not require removal or installation in order to change the service provided to each subscriber.

Another object is to provide a system combining the advantages of transmitting signals over all channels of a cable TV network, including premium channels, "in-the-clear" (i.e., without scrambling and descrambling), and the capability of controlling access to premium channels from a remote location.

Still another object is to provide circuit means controlling access to cable-transmitted television signals on one or more predetermined channels wherein the circuit means are mounted in an enclosed housing on the exterior of a subscriber structure and are controlled to permit or prevent access to each of such channels from a remote location.

A still further object is to provide novel and improved means for packaging and interconnecting electrical circuit components selectively operable to permit or prevent reception of cable-transmitted, unscrambled RF signals on predetermined channels by a subscriber television receiver.

Another object is to provide novel circuit means for processing cable TV signals to control access by a subscriber television receiver of preselected channels.

Other objects will in part be obvious and will in part appear hereinafter.

SUMMARY OF THE INVENTION

In accordance with the foregoing objects, the invention contemplates a cable TV channel security system employing conventional traps and accompanying addressing and signal switching circuitry mounted entirely within an enclosed housing adapted to be fixedly attached on, in or near a subscriber dwelling or other such structure. The cable carrying the RF signals extends from the headend location to the housing and through an opening therein for connection to the enclosed circuitry. The housing includes a cover which may be locked or otherwise securely sealed for removal only by authorized personnel to gain access to the elements mounted inside.

The circuitry within the housing may be advantageously divided into a plurality of separately packaged but electrically interconencted modules. A first of such modules, termed the address module, includes a printed circuit board mounted in a metal enclosure and having one or more edge portions for mating engagement with a receptacle of another module, termed the switch module. In the disclosed embodiment, the switch module may be divided into first and second portions, each including a printed circuit board mounted in a metal enclosure and having a plurality of pairs of threaded connectors to which the input and output ends of the traps are connected. The two enclosures of the switch module portions are mounted on opposite sides and extend forwardly of the address module enclosure so that the traps, a plurality of which may be connected to one or both switch module portions, are positioned between the two.

A conventional computer, such as an IBM personal computer, and modem in the cable company business office are connected to a rejuvenator computer and to other standard equipment at the headend location. Coded information entered by a service representative through the computer is carried as a data stream on the cable from the headend to the subscriber location. The cable is connected to the address module which includes circuitry adapted to observe the incoming data representing the address code unique to that particular subscriber location and command signals indicating which of the premium channels carried by the cable are to be received for viewing on the subscriber's television set.

The address module communicates a coded signal to the attached switch module in response to the data stream received via the cable. The switch module includes a wideband RF amplifier and a plurality of RF switching cells, any or all of which may include an associated trap. In the disclosed and preferred embodiment the traps employed are of the negative type, whereby RF signals representing a channel or program level to which a particular trap is responsive will be removed if the signals are routed through that trap. The combined amplifier and cell circuitry of the switch module directs the entire cable RF spectrum through those traps corresponding to premium channels to be removed and bypasses the traps for channels to be received. Due to the presence of a wideband RF amplifier and digital logic, the entire cable spectrum can be routed with no signal degradation at the output of the switch module, from which the signals are carried via the cable into the subscriber structure to the television receiver.

In the disclosed embodiment, each of the two portions of the switch module is adapted for the mounting of four traps, whereby the system is capable of processing as many as eight program levels, each of which may comprise one or more channels. DC power for operation of the address and switch module circuitry is provided by a conventional transformer connected to an outlet of the AC circuit in the subscriber structure.

The foregoing and other features of the cable channel security system of the invention will be more fully understood and appreciated from the following detailed description of the preferred embodiment, taken in conjunction with the accompanying drawings.

DETAILED DESCRIPTION

Figure 1:
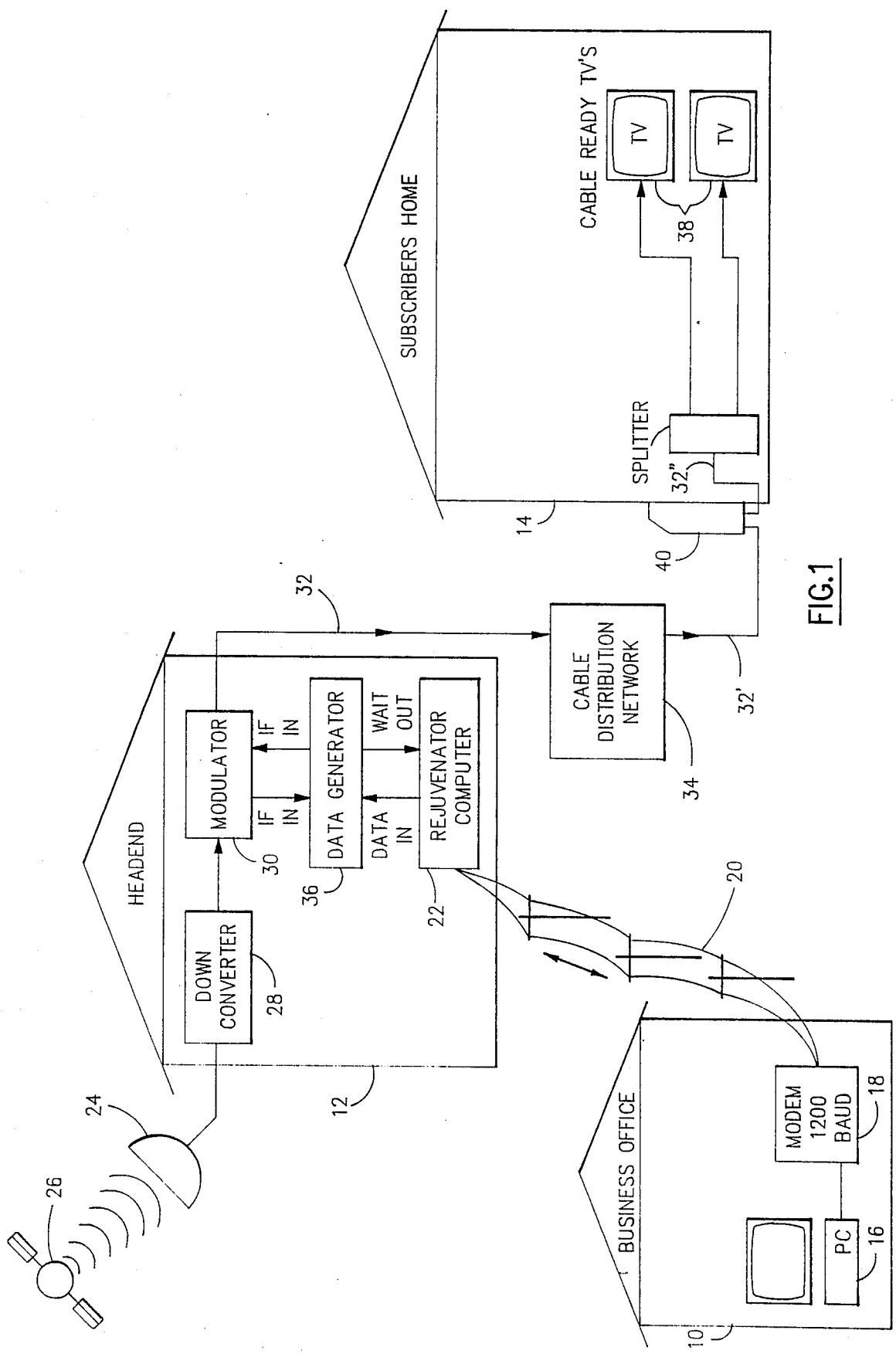
FIG. 1 is a diagrammatic illustration showing the flow of RF and other electrical signals through the complete system.

Referring now to the drawings, diagrammatically indicated in FIG. 1 are structures 10, 12 and 14, respectively representing the business office of a cable television company, the headend or originating location of the cable signal transmissions, and one of the subscriber homes or other such structures at which the incoming cable signals are received and connected to one or more television receivers. Conventional computer 16, such as a standard personal computer with the usual keyboard input means, and modem 18 are connected via existing telephone lines 20 with rejuvenator computer 22 at headend 12. The rejuvenator computer accepts coded information from the business office computer, which contains the addresses of all the remote units in the field and command codes which pertains to those units. The R.C. then transmits this information over the cable delivery system repeatedly to the field units, as described later herein. Antenna 24 receives television signals relayed from satellite 26 and provides such signals, via down converter 28, to modulator 30 for transmission over cable 32, branches of which are connected to all points in the distribution network, represented by block 34.

In addition to RF signals representing the channels, commonly 30-50, offered by the cable company, cable 32 carries coded signals representing addresses unique to each of the subscriber locations served by the cable company and commands indicating which of a certain group of channels are to be received for viewing at the respective subscriber locations. These coded signals are provided to modulator 30 in the form of IF signals from data generator 36, and are transmitted as a data stream on cable 32. All of the previously described elements located at business office 10 and headend 12 are entirely conventional in both construction and operation, having been employed in the cable TV industry for many years.

Figure 2:
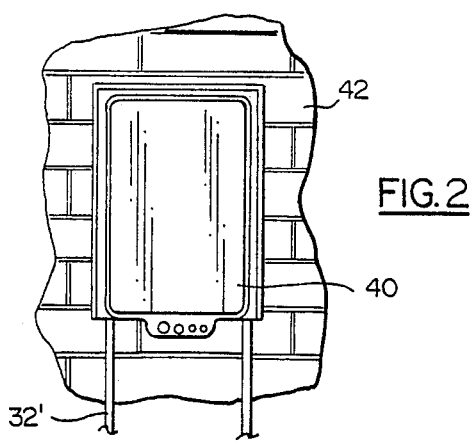
FIG. 2 is a front elevational view of the enclosed housing mounted on an exterior wall of a subscriber dwelling or other structure.

As with other utility lines, cable 32 may be strung from poles along the cable distribution network, or may be buried below ground level. In either case, a tap is installed in the main cable line for attachment of an incoming feed cable or "drop" at each subscriber location to be served, the incoming cable at subscriber structure 14 being denoted by reference numeral 32'. The television channels represented by the RF signals transmitted through cable 32 are divided into two groups, designated "basic" and "premium" channels. For an established fee, normally payable on a monthly basis, all channels in the basic group are received for broadcast and viewing on one or more conventional television receivers 38 inside subscriber structure 14. Although the RF signals representing the premium channels are also carried on the same cables 32 and 32', means are provided to prevent reception of such signals for viewing of the premium channels on receiver 38 except in response to coded data including an address signal unique to the specific subscriber location and a command code identifying the premium channel(s) to be received for viewing. Such means are provided by the present invention in the form of electronic circuitry and supporting structure enclosed within housing means denoted generally by reference numeral 40, and securely fastened by screws, lag bolts or other such means to an exterior wall 42 (FIG. 2) of subscriber structure 14.

Figure 3:
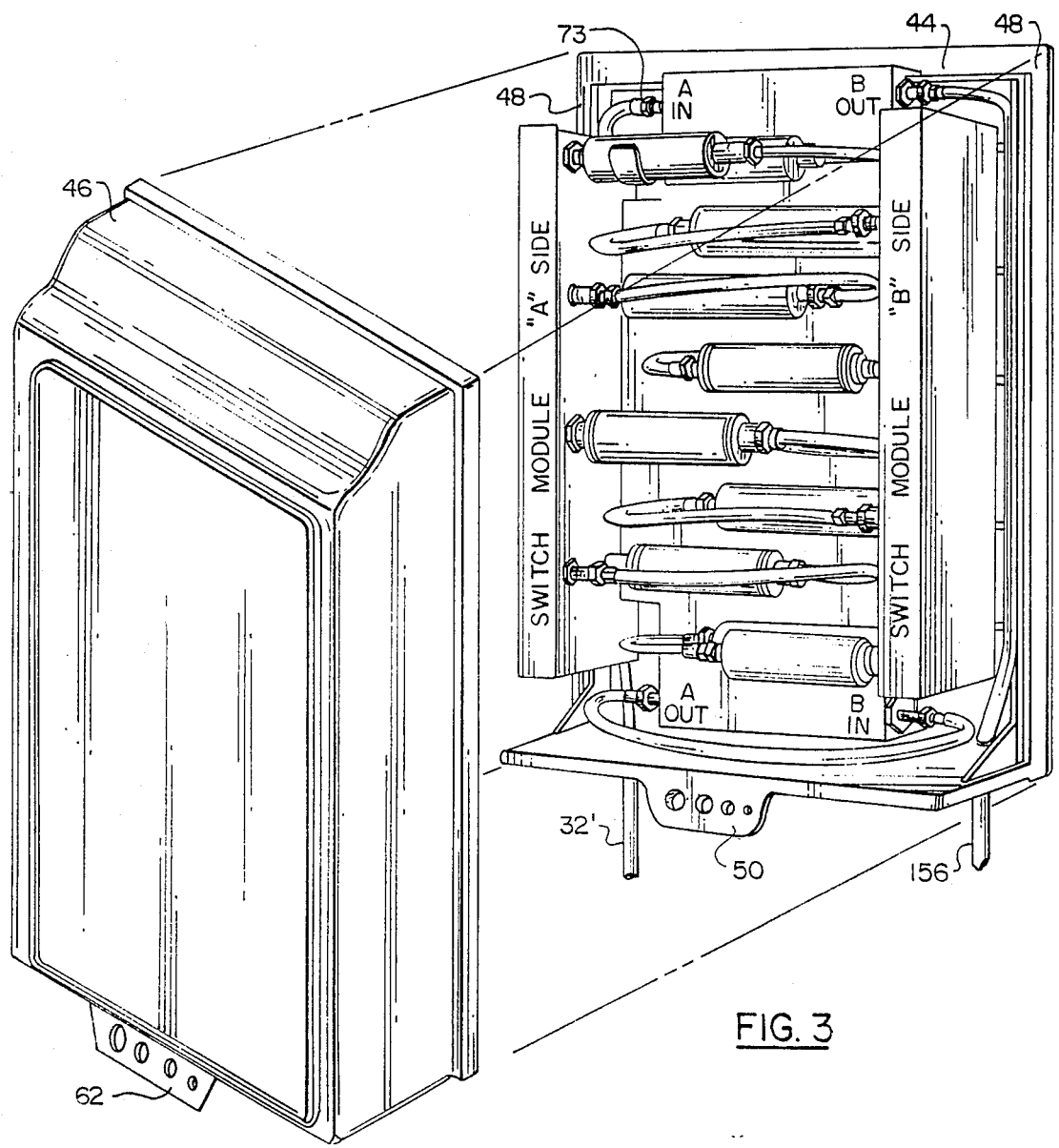
FIG. 3 is a perspective view of the housing of FIG. 2 with the cover separated from the base to show the elements mounted inside a fully assembled relation.
Figure 4:
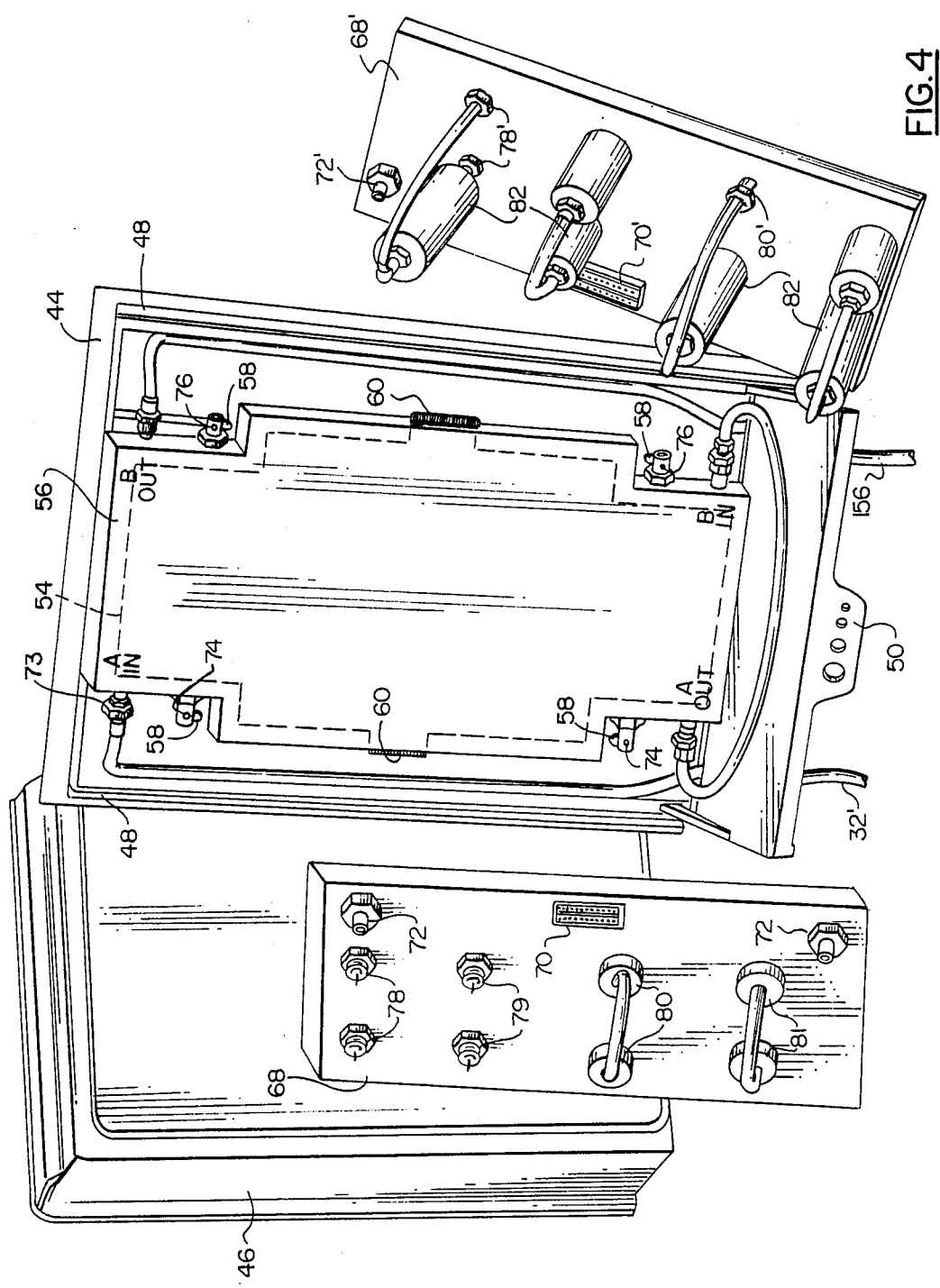
FIG. 4 is a perspective view of the elements of FIG. 3 with certain portions removed from their assembled positions.

Housing means 40 is seen in FIGS. 3 and 4 to comprise two sections, termed the base 44 and cover 46, which cooperate to form an essentially six-sided enclosure including a rear and a bottom wall provided by base 44, and a front, top and two side walls provided by cover 46. The two sections are retained in mating engagement by means of flanges 48 extending vertically along each side of base 44 which are received in cooperatively formed channels in cover 46. That is, to assemble the sections, after mounting base 44 on wall 42, cover 46 is positioned above the base and moved downwardly as the channels slide over the flanges. Depending tabs 50 and 52 on base 44 and cover 46, respectively, each include a plurality of different sized openings which are aligned when the two sections are fully engaged for passage of a bolt, wire, etc. through one or more pairs of aligned openings to discourage unauthorized opening of the housing means. The bolts or screws which fasten housing means 40 to wall 42 pass through the rear wall of base 44 and are inaccessible when cover 46 is in place.

The elements mounted within housing means 40 are divided into two major subassemblies, termed the address and the switch modules. The address module comprises a printed circuit board, shown in hidden lines and denoted by reference numeral 54 in FIG. 4, with various elements described later mounted thereon. Circuit board 54 is mounted within sheet metal enclosure 56, a relatively flat structure which is affixed by screws 58 to base 44. Edge portions 60 of circuit board 54 extend through openings in opposite sides of enclosure 56 for engagement in cooperative receptacles to establish electrical connection between elements on circuit board 54 and other elements, as described later. The address module includes threaded connectors 62, 63, 64 and 65 extending from enclosure 56 for connection of mating connectors affixed to the ends of cables, as also explained later.

In the disclosed embodiment, the switch module is divided into two sections, each including a printed circuit board mounted within a sheet metal enclosure. The circuit boards of the two sections are indicated by reference numerals 66 and 66', and the enclosures by numerals 68 and 68'. Conventional card edge receptacles 70 and 70' extend through openings in the front wall of each of enclosures 68 and 68'. The two sections of the switch module are not connected to the housing means, but may be contacted and positionally stabilized by internal portions of cover 46. The switch module sections are physically and electrically connected by edge portions 60 extending into receptacles 70 and 70', and by a pair of connectors 72 and 72' on each switch module section mating with a similar pair of connectors 74 and 76, respectively, extending from opposite sides of the address module enclosure 56.

Each section of the switch module includes a plurality of pairs of threaded connectors 78 (78'), 79 (79'), 80 (80') and 81 (81') extending through openings in the front wall of enclosures 68 and 68'. Conventional traps 82 are connected across one or more of the pairs of connectors 78-81 (78'-81') of one or both sections of the switch module. As explained later, the circuitry of each section of the switch module includes four cells, each including a pair of connectors across which one of traps 82 may be connected, each corresponding to a premium channel or program level represented by RF signals carried on cables 32 and 32'. In the disclosed embodiment, traps 82 are passive or negative traps. Thus, RF signals which are routed through a given trap are removed and do not reach television receiver 38.

When the two sections of the switch module are connected in the manner described to opposite sides of the address module, the front walls of enclosures 68 and 68' face one another, as seen in FIG. 3. The pairs of connectors 78-81 are in staggered relation to connectors 78'-81' so that traps 82 connected to one section of the switch module do not positionally interfere with the traps connected to the other section, i.e., the traps of one section lie between those of the other section, as also seen in FIG. 3. The configuration of enclosures 68 and 68' and the connectors thereon is such that identical enclosures may be used on each side in positionally reversed relationship (i.e., one enclosure is upside down with respect to the other).

Figure 5:
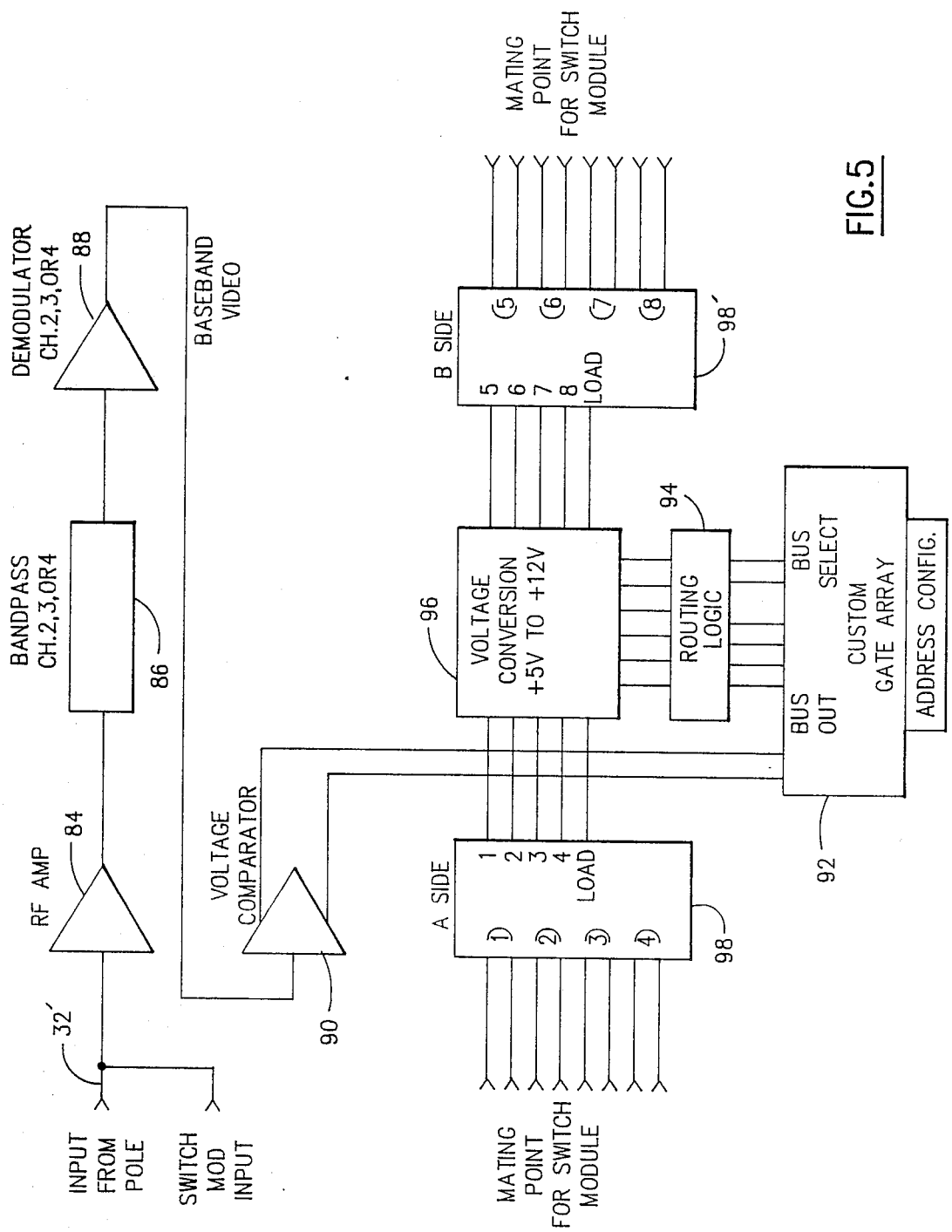
FIG. 5 is an electrical block diagram showing the operative relationship of the components of one of the two major subassemblies shown in FIGS. 3 and 4.

Referring now to FIG. 5, where the address module is shown in electrical block diagram form, incoming signals on cable 32' are connected to RF amplifier 84, thence to bandpass filter 86 and demodulator 88. Amplifier 84 has a gain of, e.g., 24 dB in the 55 MHz to 72 MHz range (representing television signals on channels 2 through 4), with the gain decreasing at both higher and lower frequencies. This amplification makes up for the loss of signal level in bandpass filter 86, and also provides the proper signal level to demodulator 88 for reliable demodulation at the minimum input level to the unit of −5 dBmV.

Bandpass filter 86 also covers the 55 MHz to 72 MHz channel band, and is tunable using adjustable ferrite slugs in fixed inductive elements. The bandpass filter is of two pole construction and has a band width of 1.5 MHz at the −3 dB point. The pass-band loss is about 1 dB.

Demodulator 88 is based around an SGS-Thompson TDA 2540 demodulator integrated circuit. This device has a frequency range of about 35 MHz to 72 MHz and is tuned using a quadrature tank circuit. The signal level needed for reliable operation is from about +20 dBmV to +45 dBmV. With RF amplifier 84 providing about 24 dB of gain, the input range of the combined amplifier 84, bandpass filter 86 and demodulator 88 is from −5 dBmV to +20 dBmV. The demodulated signal, indicated in FIG. 5 as "baseband video," has all carrier components above 1.5 MHz, such as color and aural information, filtered from it.

The previously mentioned data stream, including a subscriber address code and command code for premium channel reception, generated from the headend is carried on the video carrier or a predetermined channel, e.g., channel 2, 3 or 4. This eliminates the need for a special data carrier in the FM frequency spectrum. That is, the video signal of an actual channel becomes, in part, the data carrier. The data is encoded at the headend as a pulse located on the horizontal retrace blanking interval, also known as the "front porch", of the television signal. The data pulse may therefore be termed the "front porch pulse." The front porch pulse is amplitude modulated and exceeds normal maximum white level (87.5% depth of modulation of the television carrier) being 92% to 95% the depth of modulation of the carrier. Therefore, the front porch pulse, carrying the encoded information on a demodulated carrier signal, will always exceed the maximum peak voltage level of the television signal by two to three tenths of a volt. This will enable a circuit similar to a voltage comparator to easily extract the front porch pulse from the normal television signal.

Voltage comparator 90 is designed to segregate the front porch pulse from the rest of the base band video signal. Comparator 90 may be built around an LM 339 comparator. A first stage of comparator 90, triggered by the incoming base band video signal, acts as a positive peak detector to measure the voltage level of the front porch pulse and provide a reference. The incoming base band video signal is compared to the peak voltage, which has been divided down by about a tenth of a volt. This ensures that the incoming base band video signal is always measured and sampled at the same voltage point, and that the front porch pulse will be read with consistency.

A second stage of comparator 90 is configured as a negative peak voltage detector. The base band video signal is then compared to the negative peak voltage reference, which has been divided up by, e.g., two tenths of a volt, thereby permitting accurate sampling of the synchronization pulses. The vertical interval pulses are easily indentified by a simple resistor-capacitor, charge-discharge circuit, since they have a pulse width several times that of any of the other synchronization pulses. The vertical interval pulses are used to signal the beginning of a front porch pulse.

The outputs of voltage comparator 90 are connected to a custom gate array identified in FIG. 5 by reference numeral 92, and explained in more detail later in connection with FIG. 6.

As previously indicated, the switch module is divided into two sections, connected to opposite sides of the address module. Consequently, the eight bit command code, forming part of the front porch pulse, is divided into two four-bit words. Directional codes are required to determine when to read these four-bit codes, and to which section of the switch module they are to be transmitted. Gate array 92 is connected to routing logic 94 by a six bit data bus. Four of the information bits are utilized to indicate the particular cell of the switch module to be activated, and two bits indicate to which section of the switch module the signals are directed. Routing logic 94 comprises conventional logic elements adapted to process the six bit code in the desired manner. If the disclosed embodiment, gate array 92 and routing logic 94 are designed to operate on +5 volts DC, and the switch module is designed to operate at +12 volts DC. Accordingly, a six bit voltage conversion integrated circuit 96, such as a Motorola MC 14504, is interposed between routing logic 94 and the switch module.

It is necessary to retain the information presented by the four bit command code until such information is changed in order to maintain operation of the switch module cells at the last addressed condition. Four bit latches 98 and 98' are interposed between voltage conversion circuit 96 and the attachment of the address module to the respective sections of the switch module. Latches 98 and 98' comprise identical "D" type latches with Q and Q-NOT outputs. Both polarity outputs are required at the switch module cells to properly drive the circuitry, which is described later.

Figure 6:
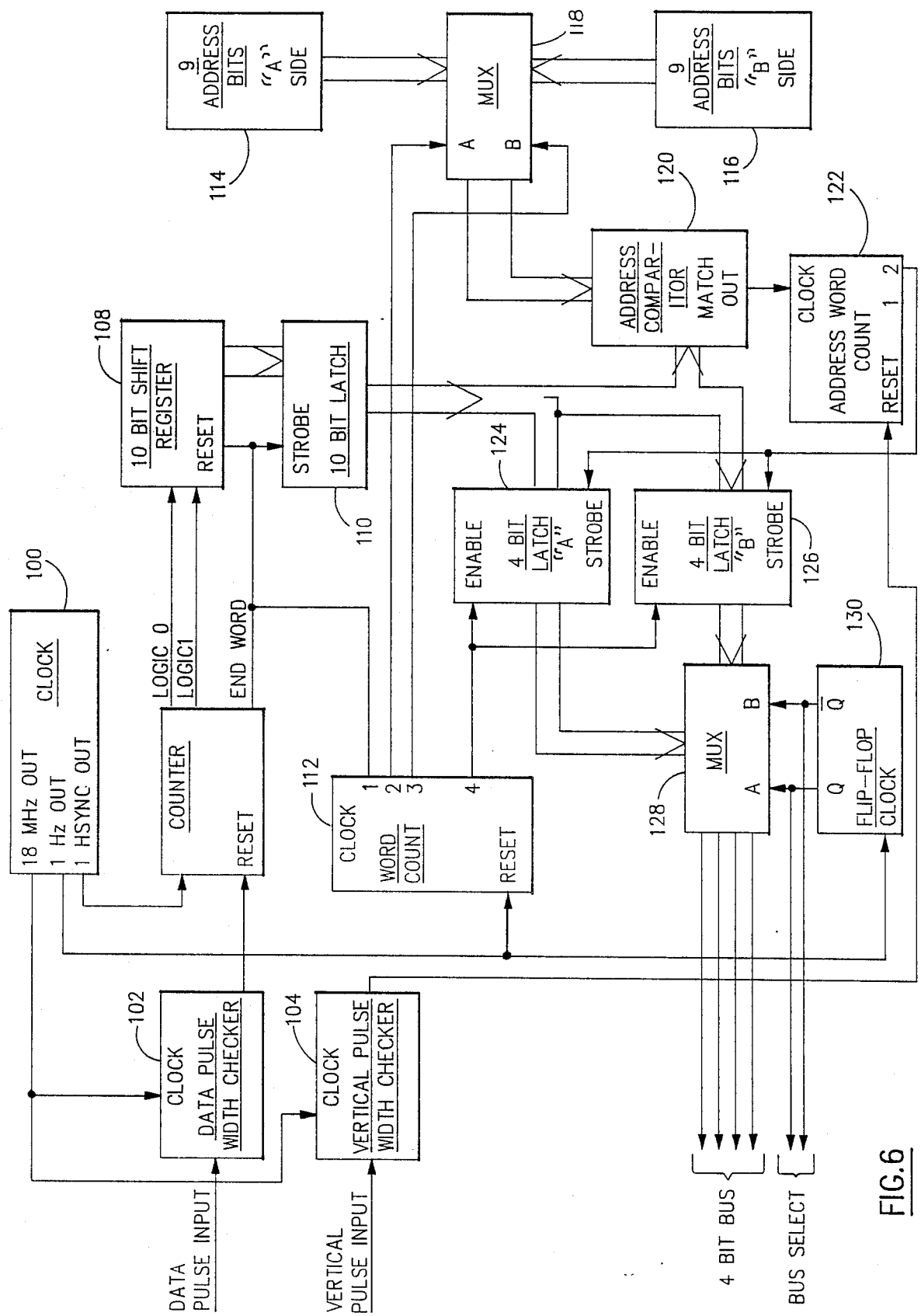
FIG. 6 is a block diagram of one of the components of FIG. 5.

Custom gate array 92 of the address module is shown in a preferred embodiment in block diagram form in FIG. 6. The gate array uses various logic functions for data decoding and address recognition. Clock 100 is driven by an 18 MHz quartz crystal which is external to the gate array. A first reference signal output of clock 100 is provided directly at the 18 MHz frequency. A second signal is generated at 1 Hz, divided down in frequency directly from the 18 MHz signal. A third clock pulse signal is generated at a frequency equal to the time period between the start of two successive video horizontal synchronization pulses, namely, 63.555 microseconds.

The 18 MHz clock signal is provided to both of logical blocks 102 and 104, identified as the data pulse width checker and vertical pulse width checker, respectively. Each of blocks 102 and 104 comprises an electronic comparator, designed to ensure that noise or other unwanted signals do not falsely trigger the addressing circuitry. The data pulse input, previously identified as the front porch pulse, is measured by block 102 by comparing its time period to a predetermined number of 18 MHz clock pulses. The pulse width of incoming vertical synchronization pulses are likewise compared by block 104 with a predetermined number of 18 MHz clock pulses. If the incoming signals do not fit the parameters of a front porch pulse or a vertical synchronization pulse, they are not forwarded to the next points in the circuitry.

Counter 106 receives the third clock pulse output of clock 100 and valid data pulses from block 102 as inputs. If five pulses from clock 100, indicating the duration of five horizontal synchronization lines, are counted between two successive data pulses, the logic state of the bit being transmitted is considered is considered a logic 0. If pulses corresponding to six horizontal synchronization lines are counted from one data pulse to the next, the logic state of the bit being transmitted is considered a logic 1. If only two horizontal synchronization pulses are counted between successive data pulses, it is considered the END OF WORD. The logic 0 and logic 1 outputs of counter 106 are provided as inputs to ten bit shift register 108. The END OF WORD output is provided as a reset input to shift register 108 and as a strobe input to ten bit latch 110.

To describe how these pulses convey information according to the disclosed embodiment of the invention, a brief explanation of the data construction is now provided. As explained earlier, the addressing information is carried as a front porch pulse on an existing video signal. The coded signals corresponding to the address of a specific subscriber location are generated in the time period required to generate one complete television raster, i.e., the time period between two consecutive vertical reset pulses. Four "words" of data, each consisting of ten binary bits, are transmitted in this time period. Each bit is switched to its appropriate logic state by the indicators at the output of counter 106. The first bit of each word is a start bit to ensure proper reception of each word of data. If the first bit is not a logic 1 in any of the four words, the transmission is considered invalid and the circuitry resets itself when the END OF WORD flag is activated to await the next four word data stream. In the present system, the first of the four words is not used, i.e., it simply provides data space for possible future use. The second and third words provide first and second portions of the transmitted address in binary form. As explained later, the address module includes two sets of nine address pins each of which are connected either to ground (representing logic 0) or to the +5 volts DC supply voltage (logic 1) external to the gate array. Each of the nine data bits following the first bit of the second and third words is matched to one of the address pins in the two sets. If the binary words represented by the last nine bits of each of the second and third words matches the preset logic configuration of the adresss pins, the last eight bits of the fourth word, which form the command signals, are shifted into a holding register. These command bits are then transmitted, four at a time, to control the switching of the cells in the appropriate section of the switch module.

Data from counter 106 is accepted, one bit at a time according to the indicators at the output of counter 106, by ten bit shift register 108. When a ten bit word is received by shift register 108, if the first bit is a logic 1 and the END OF WORD flag is activated, the ten bits are accepted as valid and shifted into ten bit latch 110. After the bits are shifted, shift register 108 is cleared by the END OF WORD reset pulse for the next transmitted word. Data is strobed into ten bit latch 110 at the end of every valid transmitted word, and stored for further processing.

Logic block 112 counts and indicates which of the four words is being currently transmitted. The four outputs of word count 112 each correspond to one of the words in the data stream. Word count block 112 is reset by a vertical interval pulse from block 104 at the beginning of the first word of an address transmission, activating the output or indicator line corresponding to the first word. At the end of transmission of the first word, the END OF WORD signal from counter 106 increments word count block 112 by one to indicate the beginning of transmission of the second word. Word count block 112 continues to be incremented by one at the end of the transmission of each word, whereby the four words can be properly identified and processed.

Blocks 114 and 116 represent the hard-wired pins forming the address configuration for the particular subscriber location. Although shown for convenience in FIG. 6, it will be understood that the address pins are external to the gate array. The pins are wired to conform to a predetermined address at the time of manufacture, during printed circuit board assembly. The address bits from blocks 114 and 116 are made available in the predetermined logic configuration of each to multiplexer 118. The address codes from blocks 114 and 116 are presented through block 118, in accordance with inputs from word count block 112 to address comparator 120.

Address comparator 120 receives inputs from latch 110 and multiplexer 118 and compares the word latched into block 110 with the hard wired address from blocks 114 and 116. If the address bits from latch 110 match the bits from block 114 or 116, which are presented in sequence as determined by the inputs from word count block 112, a signal is generated on the "match out" line from address comparator 120.

Address word count block 122 counts the number of times a signal is received on the match out line from block 120 during each completely generated raster or field of video, as indicated by the input to block 122 from block 104. If the address bits from block 110 match those from blocks 114 or 116, depending upon which word is being transmitted, address word count block 122 will provide an output signal to latch the command code into two four bit latches 124 and 126.

Each of four bit latch blocks 124 and 126 is enabled by the word "4" signal from word count block 112. The transmitted command code (code word 4) is latched into block 124 or 126 if the proper address has been detected as indicated by block 122. The command codes from latches 124 and 126 are sequentially presented as inputs to multiplex block 128 four bits at a time.

Flip-flop 130 is triggered at 1 Hz intervals by clock 100 to sequentially change the Q and Q-NOT logic states of multiplex block 128. This provides all eight bits of the command code at the output in two 4-bit sequences, switching at a 1 Hz rate. The outputs of flip-flop 130 are also presented externally of the gate array for proper decoding of the two 4-bit sequences of the command code. The 4-bit output of multiplexer 128 and the 2-bit output of flip-flop 130 are provided to routing logic block 94 of FIG. 5, as previously described.

Figure 7:
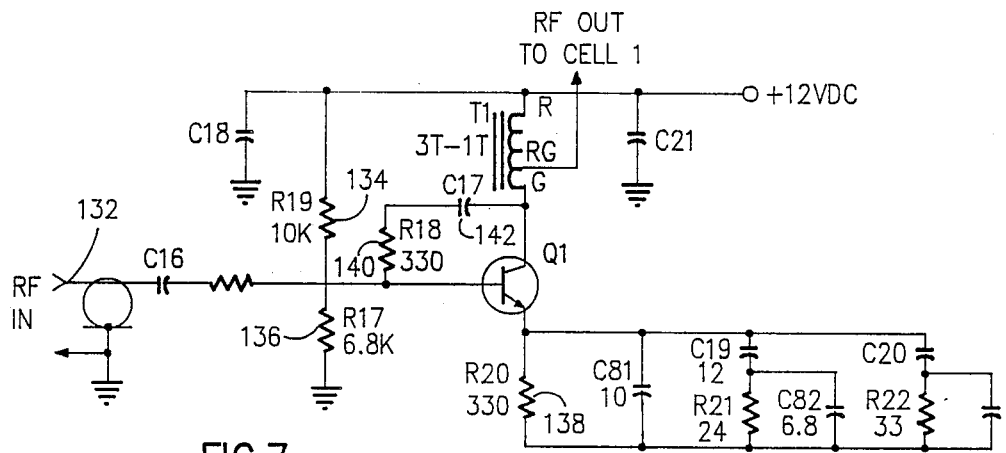
FIG. 7 is an electrical schematic diagram of an element of the second major subassembly of the system shown in FIGS. 3 and 4.

The second major subassembly of the signal processing means of the invention will now be described, with reference to FIGS. 7 and 8. The so-called switch module comprises a wide band RF amplifier and a plurality of discrete switches or cells. The combined amplifier and cell circuitry, using the previously described digital logic, will route the entire cable television RF spectrum through or around the negative traps assigned to each premium television channel.

The incoming RF signal on line 132 is applied to the base of transistor Q1, such as a Motorola NPSH-17 bipolar transistor, through a voltage divider provided by a 10 Kohm resistor 134 and 6.8 Kohm resistor 136. A 330 ohm emitter resistor 138, in conjunction with the base bias voltage divider, induces a 12 MA DC current through the collector circuit of transistor Q1. The RF gain parameters of the amplifier are mainly determined by both the emitter circuit, and the collector-to-base negative feedback circuit. The emitter circuit consists of a low pass filter network which will determine the initial gain and frequency response of the amplifier. A 330 ohm resistor 140 and 0.001 microfarad capacitor 142 provide a collector-to-base negative feedback network responsible for the input-to-output impedance matching along with the flatness in frequency response.

The amplifier also uses a one-turn primary and three-turn secondary RF transformer 144 in the collector circuit. This transformer is responsible for changing the collector impedance of 130 ohms to approximately 75 ohms, helping to insure a maximum RF power transfer to the RF switching cells. The RF gain characteristic of the amplifier is a 7 Db gain average over a bandwidth of 50–400 MHz. The amplifier input return loss is not less than 10 Db, and the output return loss is a 6 Db minimum over the specified bandwidth.

Figure 8:
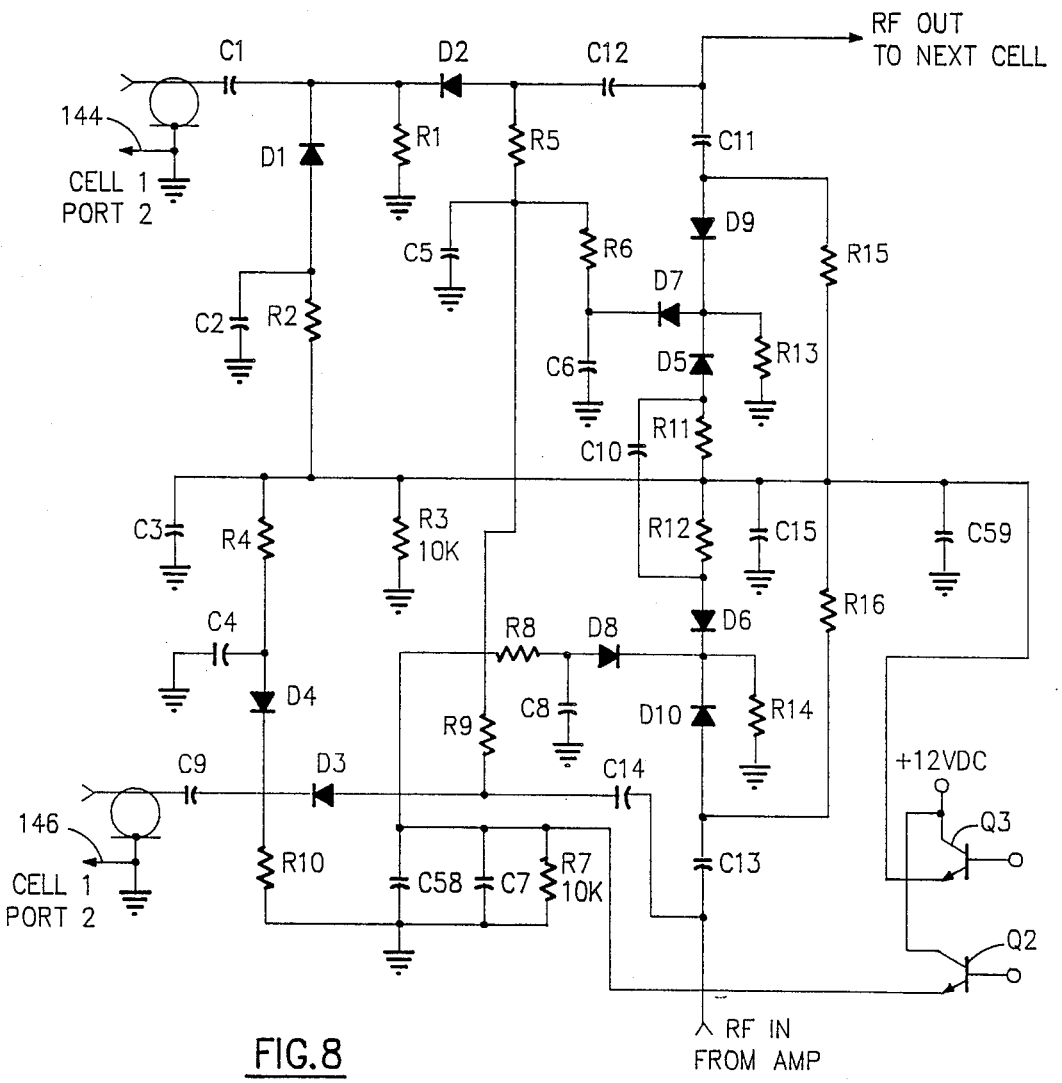
FIG. 8 is a schematic diagram of another element of the second subassembly.

An exemplary circuitry configuration for the individual cells, each of which are identical, of the switch module is shown in FIG. 8. The switching cells utilize high speed switching diodes as single-pole, single-throw switches. Two transistors Q2 and Q3 (PN 2222) are used to drive the cell, relieving the current responsibilities from the drivers within the address module. It is important to note that transistors Q2 and Q3 are driven in complement to each other. When the base of transistor Q2 is driven high by input from the address module, this transistor goes into conduction and forward biases diodes D1, D4, D5, D6, D9 and D10, and reverse biases diodes D2, D3, D7 and D8. When diodes D5, D6, D9 and D10 conduct, RF is allowed to pass through the cell, bypassing a trap connected across cell input and output ports 144 and 146, respectively. When diodes D2 and D3 are back-biased, RF is not allowed to pass to the cell ports. With D1 and D4 conducting, each cell port is terminated to ground, not allowing the trap impedance to reach the RF bypass circuitry.

When the signal from the address module drives transistor Q3 high, and releases transistor Q2 from conduction, the RF signal is directed through the trap connected across the cell ports. When this is done, diodes D1 and D4 are back-biased to release to the port ground termination, and diodes D2 and D3 are forward biased, allowing RF to flow into and out of the cell ports, and thus through the traps. Diodes D5, D6, D9 and D10 are back-biased, preventing the RF from passing around the cell ports. Diodes D7 and D8 are conducting, terminating any residual RF in the bypass path to ground.

Current draw from a switch module cell in the bypass condition is about 6 milliamps. Current draw while the ports are engaged is approximately 4 milliamps. RF isolation fro the through pass circuitry while the ports are engaged in 55 Db from 50–300 MHz, and 50 Db at 400 MHz. Loss in RF level through the cell while in the bypass condition is approximately 1.2 Db. The amount of loss in RF signal while the ports are engaged is also 1.2 Db, not including any losses through the trap.

Figure 9:
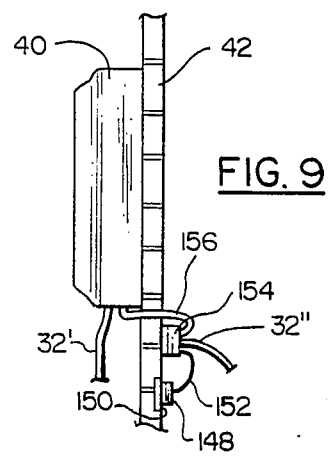
FIG. 9 is a somewhat diagrammatic illustration of the electric and TV cable connections to and from the housing of FIG. 2.

Since the subscriber location must have a supply of AC power available for operation of the television receiver, such power may be utilized in appropriately modified form for the system of the present invention. As shown in FIG. 9, conventional transformer 148 is plugged into AC wall outlet 150, and connected by line 152 to power inserter 154 on the interior of the subscriber structure. Electrical power at a minimum of 15.5 volts DC is provided from power inserter 154 through line 156 to the previusly described circuitry of the present invention. RF signals from the switch module are provided to inserter 154 on line 156 and to television receiver(s) 38 through cable extension 32" inside the subscriber location. Thus, the RF signals provided in the clear to receiver(s) 38 include the basic cable channels and the premium channels designated by the encoded signals in the manner previously described.

Although the modules, connectors, etc. may be arranged in physical configurations other than that shown, the illustrated construction offers the advantages of compactness and simple but reliable interconnection of separate modules. RF signal input to the address module is through the connection of cable 32' to connector 73; the same RF signals are provided to the switch module sections through the mating connectors 72 and 74 on one side and 72' and 76 on the other side.

It will be understood from the foregoing description that only one of the two illustrated switch module sections need be employed if control of not more than four premium channels is required, which is often the case. That is, operation of the system is in no way affected by whether one or both switch module sections are connected to the address module. Likewise, any desired number of traps, from one to four, may be connected to either or both switch module sections. Since all RF signals on cable 32" within the subscriber structure are provided in the clear, regardless of whether positive or negative traps are used, any number of television receivers 38 within a particular structure equipped with the present invention may be connected in the system. Furthermore, all such receivers may be of the cable-ready type and may be further connected to associated VCRs with no loss of any available functions.

A system such as that described is capable of polling up to 3,600 subscriber locations per minute. Pay-per-view can also be supported, as long as a telephone return path is provided. No scrambling costs are associated with the headend because channel security is provided entirely by well developed and understood trap technology. Also, the system will accommodate virtually any commercially available trap, permitting operators to utilize traps already in the field. The invention may also be employed, if desired, in a system using addressable converters. Although reference has been made to the control of an individual premium channel by each trap, it will be understood by those familiar with trap technology that reception of more than one channel within a given program level may be controlled by a single trap.

What is claimed is:

1. In a cable television distribution system including:
(i) means for transmitting RF signals at a plurality of program levels via first cable means through respective directional taps and cable drops to subscriber locations, each having an available supply of AC power, throughout a distribution network;
(ii) at least one television receiver at each of said subscriber locations;
(iii) means for selectively generating electrical signals in predetermined sequences unique to each of said subscriber locations;
(iv) means for transmitting said electrical signals via said first cable means to said subscriber locations; and
(v) second cable means connecting said first cable means to said television receiver at each of said subscriber locations;
channel security means connected in said cable drop between said directional tap and said second cable means at a particular one of said subscriber locations for selectively permitting or preventing in-the-clear reception of at least one of said program levels by said receiver at said particular one of said subscriber locations, said channel security means comprising:
(a) at least one RF trap adapted to act upon said RF signals at said one program level in a manner permitting or preventing in-the-clear reception thereof by said receiver;
(b) circuit switching means operable in a first mode to direct said RF signals at said one program level to said trap, and in a second mode to direct said RF signals at said one program level to said receiver exclusively of said trap;
(c) circuit address means operative in response to said electrical signals in the sequence unique to said one of said subscriber locations to control operation of said circuit switching means between said first and second modes thereof; and
(d) means connecting said AC power from said subscriber location to said switching and adrress means to provide operating power thereto.

2. The channel security means of claim 1 wherein said trap is a negative trap.

3. The channel security means of claim 1 and further including a plurality of said traps, each responsive to a different one of said program levels, and wherein said sequence of electrical signals includes a first portion unique to said one of said subscriber locations and a second portion unique to each of said plurality of traps, and wherein said address means is further operative to control, in response to said second portion of said sequence of electrical signals, which of said traps are to have RF signals directed thereto by said switching means module in said first mode thereof.

4. The channel security means of claim 1 and further including housing means defining an enclosed space wherein all of said trap, said switching means and said address means are positioned.

5. The channel security means of claim 4 wherein said subscriber location includes a building structure wherein said receiver is located, and said housing means is affixed to an exterior wall of said structure.

6. The channel security means of claim 4 and further including first and second cables passing through said housing means, said first cable carrying said RF signals and said electrical signals transmitted from said headend, means for communicating said RF signals and electrical signals from said first cable to said switching and address means, and means for communicating RF signals from said switching means through said second cable to said receiver.

7. The channel security means of claim 6 wherein said connecting means comprises a transformer connected to said AC power and further comprising an electrical conductor passing through said housing means and carrying said operating power for operation of said switching means and said address means.

8. The channel security means of claim 7 wherein said second cable includes said electrical conductor.

9. The channel security means of claim 1 and further including first and second enclosures wherein said switching means and said address means are respectively positioned, and electrical connector means extending from each of said first and second enclosures establishing electrical communication between said switching means and said address means.

10. The channel security means of claim 9 wherein said connector means comprises at least one printed circuit board edge portion extending from said second enclosure and a board edge receptacle extending from said first enclosure, said receptacle being adapted to receive said board edge portion to establish said electrical communication.

11. The channel security means of claim 10 and further including at least one pair of additional electrical connectors extending from said first enclosure and said trap includes opposite end portions respectively connected to said pair of additional connectors.

12. The channel security means of claim 10 and further including a plurality of pairs of additional electrical connectors extending from said first enclosure, and a plurality of said traps each having opposite end portions respectively connected across one of said pairs of additional connectors.

13. The channel security means of claim 12 wherein said first enclosure is a relatively flat, six sided enclosure, having two relatively large and four relatively small sides, and all of said additional connectors extend from the same one of said relatively large sides, whereby all of said plurality of traps are positioned on the same side of said first enclosure.

14. The channel security means of claim 13 wherein said second enclosure is a relatively flat, six-sided enclosure having two relatively large and four relatively small sides, and said board edge extends from one of said relatively small sides, and said receptacle entends from said first enclosure in a position such that, when said board edge and said receptacle are mutually engaged, said same relatively large side of said first enclosure is disposed at substantially 90° to one of said relatively large sides of said second enclosure, and said traps are positioned forwardly of said one relatively large side of said second enclosure.

15. The channel security means of claim 14 wherein said switching means is divided into two, physically separate sections, one of said sections being positioned in said first enclosure and the other of said sections being positioned in a third enclosure essentially identical to said second enclosure, including said receptacle and said additional connectors extending from one of said relatively large sides of said third enclosure.

16. The channel security means of claim 15 wherein each of a further plurality of traps is connected to said additional connectors extending from said one relatively large side of said third enclosure, and said receptacle of said third enclosure is engaged with a second edge portion of said printed circuit board extending from a second of said relatively small sides of said second enclosure, whereby said one of said large sides of said third enclosure is disposed at substantially 90° to said one relatively large side of said second enclosure, and said one relatively large side of each of said first and third enclosures are in spaced, parallel relation to one another.

17. The channel security means of claim 16 wherein said pairs of additional connectors extend from said one relatively large side of each of said first and third enclosures in such physical relation that said plurity of traps connected to said first section of said switching means are disposed between said plurality of traps connected to said second section of said switching means.

18. A system for controlling reception by a television receiver of at least one of a plurality of television program levels transmitted as RF signals from a headend location to a subscriber structure having an AC power supply and wherein said receiver is located, said system comprising:
 (a) an enclosed housing secured in a position proximate to the exterior of said structure;
 (b) first cable means adapted to carry said RF signals including a first portion extending between said headend location and a directional tap, and a cable drop portion extending between said directional tap and said housing;
 (c) second cable means adapted to carry said RF signals extending between said housing and said receiver;
 (d) at least one trap mounted inside said housing and operable to either permit or prevent passage of RF signals at a predetermined program level for reception in the clear by said receiver;
 (e) first means powered by said AC power supply and electrically connecting said cable drop to said second cable means either through or around said trap in response to actuation by a predetermined electrical signal; and
 (f) second means at a location remote from said structure for selectively controlling transmission of said predetermined electrical signal to said first means, whereby selective transmission of said predetermined electrical signal is effective to permit or prevent transmission of said RF signals on said first cable means to said second cable means for reception by said receiver.

19. The system of claim 18 wherein said RF signals are transmitted from said headend, carried by said first and second cable means and received by said receiver in the clear, and said trap is a negative trap.

20. The system of claim 19 wherein said first cable means carries said RF signals at a plurality of separate frequencies, each corresponding to a distinct program level of said RF signals.

21. The system of claim 20 wherein a plurality of said traps are mounted inside said housing, each of said traps being selectively operable to either permit or prevent passage of RF signals at a distinct one of said separate frequencies in response to a predetermined electrical signal unique to each of said traps, said second means being operable to selectively transmit each of said unique signals.

22. The system of claim 21 wherein said second means comprises a personal computer.

* * * * *